UNITED STATES PATENT OFFICE 2,669,521

FLAME RESISTANT COMPOSITIONS

Lester A. Bierly, Silver Springs, Fla., assignor, by mesne assignments, to Diamond Alkali Company, Cleveland, Ohio, a corporation of Delaware No Drawing. Application April 17, 1948, Serial No. 21,742

17 Claims. (Cl. 106—15)

This invention relates to natural and synthetic polymeric thermoplastic materials and particularly relates to such thermoplastic materials having substantial fire and flame-resistant properties.

The invention, in general, contemplates the provision of flame-resistant natural and synthetic polymeric thermoplastic materials comprising a major proportion of a thermoplastic substance compounded and incorporated with a minor proportion of flameproofing ingredients comprising a highly chlorinated organic material and an inorganic flame-retardant substance, which materials are adapted to co-act at flame temperatures to smother any flaming of the thermoplastic material itself, whereby the total combination of substances is rendered highly flame-resistant and is adapted for use in many applications from which heretofore the thermoplastic materials have been barred by their natural flammability. Other materials may optionally be included in the composition, such as plasticizers, lubricants, and the like, the lubricants being of a special significance in injection molding operations.

The flameproofing of flammable materials, such as textile and other fabric materials, is not new and the provision of flameproofing materials such as the combination of highly chlorinated organic materials and inorganic flame-retardant substances, as applied to these fabric based materials, is not new. However, the application of these materials in the prior art has been only to such fabric based compositions and it has not heretofore been suggested to employ these materials in the peculiar relationship disclosed herein to obtain substantial non-flammability of natural and synthetic polymeric thermoplastic materials without such a loss of the desirable properties of the thermoplastic materials as to render the proposal without any practical application whatsoever.

It has also been suggested to render molded plastic materials flame-resistant by various expedients, none of which has enjoyed any degree of success and none of which has experienced successful commercial application. A typical example of these prior proposals involves the combination of chlorinated diphenyl with various thermoplastic substances, of which polystyrene is an example. The provision of this combination is in fact a flame-resistant polystyrene, if sufficient chlorinated diphenyl is employed, but the material may be regarded as substantially not reduced to practice in a practical sense, since the chlorinated diphenyl, a highly stable substance at relatively elevated temperatures, is also a highly toxic substance and cannot be used in combination with thermoplastic materials which may be subject to any elevated temperatures whatsoever in sufficient concentration to impart flame resistance without danger to personnel in the general vicinity of the materials. Accordingly, this suggestion of flameproofing thermoplastic materials has met with no success whatsoever in view of the danger of its use.

One of the principal limits to the growth of the application of natural and synthetic polymeric thermoplastic materials to various fields of art is the fact that substantially all of such thermoplastic materials have relatively low flaming points and thus may not be used in any applications where high temperatures or direct exposure to fire may be anticipated as being encountered in use. Among presently forbidden uses of such thermoplastic materials are all electrical applications, including such applications as fuse boxes, switch plates, containers of various sorts for wires, and the like. Additional applications for which thermoplastic materials of this general class would have high use in the event that the fire hazard involved was eliminated are housings for electric motors in domestic and manufacturing equipment, coverings for housings on domestic electrical apparatus, such as refrigerators, freezers, washers, and the like, and in particular structural elements, such as wall tile, and the like. In the absence of substantial flame resistance, thermoplastic materials have been unavailable for application in these broad fields; it is an object of the present invention to provide a means by which the thermoplastic materials may be rendered so resistant to flaming at flame temperatures that their application in these fields shall become a reality.

As noted above, this invention envisions the solution of the problem of general application of thermoplastic materials to these various uses by flameproofing the natural and synthetic polymeric thermoplastic materials to a point that the compounded materials do not support combustion. By supporting combustion in this connection is meant that when a flame, such as a flame of a Bunsen burner having a blue cone of about two inches in height, or the like, is applied to the material and allowed to remain in contact therewith for a period of up to five seconds and then is removed, the flame on the plastic material disappears within a period of no more than three seconds and usually in a period of no more than one second.

In contrast to this property of the flameproofed materials of this invention, thermoplastic materials of the class under discussion herein, of which polystyrene having a molecular weight of between 50,000 and 150,000 is an example, burn readily upon the removal of the flame therefrom until the object of, for example, polystyrene is entirely consumed. A similar object to which a similar Bunsen flame is applied, which material has incorporated therein the flameproofing composition of this invention, burns for less than two seconds after the flame has been removed therefrom.

In accordance with the present invention, a plastic material to be flameproofed may be treated in partially or completely polymerized state. It is a preference in treating the plastic materials to combine therewith the organic chlorinated flameproofing ingredient and the inorganic flameproofing ingredient of this invention with the thermoplastic material to be flameproofed by highly efficient mixing. For this purpose, the thermoplastic material may suitably be brought to a temperature at which its physical form is incipiently liquid and the flameproofing material suitably combined therewith by highly efficient mixing, which mixing is preferably designed to incorporate the materials with each other in a highly efficient manner, so that substantial homogeneity of the various materials is achieved. For this purpose may be used such mixing devices as a rubber mill, Banbury Mixer, or other well-known type of high speed mixer suitably adapted for thorough combination of semi-plastic substances. The materials may also be mixed by extruding them, at temperatures of the order of the flow temperatures of the thermoplastic material to be flameproofed, one or more times through suitable orifices whereby intimate mixing occurs as an incident to extrusion.

Examples of polymeric materials of the thermoplastic type which may be rendered flameproof by combination with the flameproofing composition of this invention include natural and synthetic thermoplastic materials, examples of which are natural and synthetic rubber, polystyrene, cellulose acetate butyrate or propionate, polyethylene, methyl methacrylate, and derivatives thereof, such as ethyl, iso-propyl, butyl, and other methacrylates, ethyl cellulose, cellulose acetate, vinyl polymers, such as vinyl acetate or propionate, either alone or copolymerized with other thermoplastic substances, coumarone-indene polymers, polyterpene polymers, and the like.

As noted above, the flameproofing composition of this invention comprises a mixture of a highly chlorinated organic material, an inorganic flame-retardant material, and certain other optional additives. The highly chlorinated organic material may comprise any high molecular chlorinated organic substance containing between 50% and 80% of chlorine, such as chlorinated aliphatic or cyclo-aliphatic compounds containing more than eight carbon atoms, examples of which are paraffin hydrocarbons, waxes, fats, oils, higher fatty acids, higher fatty acid esters, and the like. The inorganic flame-retardant substance may suitably be chosen from the group of bismuth oxide, arsenic oxide, antimony sulfide, bismuth sulfide, arsenic sulfide, and antimony oxide, in general, it being preferred to employ antimony oxide for its easy availability and high flameproofing activity with the chlorinated organic material.

It will be appreciated by those skilled in the art that various plasticizers may be added to these compositions either before compounding with the actual plastic materials or during the compounding of the flameproofing composition with the plastic materials. Such plasticizers may include phosphoric acid derivatives, such as tricresyl phosphate, triphenyl phosphate, and ethyl hexyl phosphate, phthalates, such as dibutyl phthalate, and dioctyl phthalate, sebacates, such as dioctyl sebacate, ricinoleates, such as butyl ricinoleate, glycol derivatives, such as triethylene glycol di-2-butyrate, sulfonamides, such as o- and p-toluene ethyl sulfonamide, laurates, such as amyl laurate, liquid chlorinated organic materials, such as chlorinated paraffin having from approximately 30% to approximately 50% of chemically combined chlorine, the preference being for chlorinated paraffin having about 40% of chemically combined chlorine. Of these plasticizers, tricresyl phosphate and 40% chlorinated paraffin are preferred as they possess substantial flame resistance and thus do not add to the flammability of the thermoplastic composition, and the like.

In addition and in particular, to enhance the ease of the molding operation where these materials are employed in such applications, the addition of a small percentage of lubricating material, which has the effect of enabling the material to be injection molded without adhering too securely to the mold, thus preventing easy removal, may be employed. Examples of such materials are oleic and stearic acids, alkaline earth stearates and oleates, such as calcium stearate, calcium oleate, and the like.

The flameproofing composition may therefore comprise a mixture of the essential flameproofing ingredients, including the chlorinated organic material of which chlorinated paraffin, having above 50% of chlorine and preferably between 50% and 80% chlorine, suitably about 70% thereof, is an example, and the inorganic flame-retardant material, of which antimony oxide is an example. These materials may be used in various quantities to make up a flameproofing composition to be combined with one or more of the thermoplastic materials set forth above. In general, it is preferred to use a composition comprising not over 75% of chlorinated organic material and at least 25% thereof, with a substantially correspondingly inverse amount of the inorganic material, such as antimony oxide, that is, between 25% and 75% thereof. If desired, the plasticizing material may be added to the flameproofing material and have its subsequent effect in the completed fire-resistant plastic composition. Particularly where it is necessary to use substantial quantities of plasticizer, such as 10% and above, the employment of flame-resistant plasticizers, such as chlorinated paraffins and phosphoric acid derivatives, is preferred. In general, however, the use of plasticizers in amounts of less than 10% of the flame-resistant plastic mass is found satisfactory and in such amounts, the other plasticizers herein disclosed may be used. The lubricant material may also be included in the flame-resistant composition, if desired, and may be added in an amount equal to about 1% to 5% of the final plastic mixture.

In general, for a desirably flameproofed plastic material which may suitably be molded as by injection molding, the flameproofing material should be added to the plastic material in an amount equal to not more than 50% of the entire plastic material and is preferably added in an amount equal to at least 15% of the final flame-resistant plastic composition.

The flame-resistant compositions of this invention find particularly desirable application in fields where high temperatures or direct exposure to fire may be anticipated as being encountered in ordinary or extraordinary use. Among such uses, as set forth heretofore, are electrical applications, including fuse boxes, switch plates, and the like, housings for electrical equipment, and in structural elements, such as wall tile and the like, where in the event of fire, the flame-resistant properties of the materials are particularly significant. They may also be used in these and other applications in public buildings and other public places, where the law requires that structural materials have high non-flammability.

As noted above, the materials of the present invention may suitably be combined by mixing prior to the molding operation or may be mixed as an incident to the molding operation, such as by extruding the same for several times and returning the product of extrusion each time to the extrusion cylinder for reextrusion, whereby mixing is enhanced. Once the mixing has become complete, the materials of this invention may suitably be molded by well-understood methods which require no extended discussion here, the best example of which is injection molding, wherein the materials may be suitably shaped in desired form for ultimate use. The temperature encountered in injection molding is preferably the minimum temperature necessary for proper molding and the materials are preferably held for a minimum length of time in the heated cylinder of the injection molding apparatus prior to molding, in order that the natural decomposition effect of the flameproofing ingredients, desirably incorporated herein and anticipated to decompose in the event of fire, shall not take effect in the molding operation. Thus, it is preferable in injection molding of the materials of this invention to employ minimum cylinder temperatures which will permit the desired injection molding operation, such as temperatures of the order of 300–400° F., and to hold the material in the cylinder for relatively short periods of time. The materials may suitably be molded under pressures commonly used by those skilled in the injection molding art, such as of the order of 5,000 to 20,000 lbs. per square inch.

In addition to injection molding, various desired shapes may be made by extruding processes, by compression molding, and by transfer molding. The materials may also be employed in combination with various well-known solvents to make lacquers, especially of an opaque character, particularly in view of the opaqueness of the antimony oxide or its equivalent incorporated in the combination. They may also be employed as reinforced or unreinforced flexible films and may suitably be deposited as films from solvents or, if desired, the films may be made on mills in the usual manner. Films may also be made by the customary doctor blade technique from solutions of the materials in solvents and may be sprayed into films, if desired.

In order to inform those skilled in the art of the preferred ways of practicing this invention but in no sense to be taken as limiting the scope of the present invention, the following specific examples are set forth:

Example 1

10 gms. of cellulose acetate butyrate, 1½ gms. of chlorinated paraffin containing 70% of chemically combined chlorine, and 2 gms. of antimony oxide, all of the ingredients being in finely comminuted form, are mechanically combined until the mixture is substantially homogeneous. The mixture is then placed in a heated press under a pressure of about 1,000 lbs. per square inch, the temperature of the platens being between 250–300° F. The material is kept in the press for a period of five minutes, the platens being adjusted to produce a film of the material of between 0.005 and 0.010 inch thickness. At the end of five minutes, the film is removed from the press and is subjected to a flame of an ordinary wooden match. Upon the removal of the flame from the film, the film extinguishes itself in a period of less than one second. A similar sample of cellulose acetate butyrate without the added flameproofing ingredients burned upon the removal of the match until the film was completely consumed.

Example 2

5 gms. of cellulose acetate butyrate, ½ gm. of chlorinated paraffin having about 70% of chemically combined chlorine, 1 gm. of antimony oxide, and ½ gm. of tricresyl phosphate are intimately mechanically mixed until the mixture is substantially homogeneous. This material is treated in a press in the manner of the material of Example 1, and the film obtained is found similarly not to support combustion, the evidence of burning thereon disappearing within one second of the time the flame is removed therefrom. The film is notably less brittle than that obtained with the material of Example 1.

Example 3

5 lbs. of cellulose acetate butyrate, 1½ lbs. of chlorinated paraffin having 66% of chemically combined chlorine, and 1 lb. of antimony oxide are mixed in the manner of Examples 1 and 2 and similarly treated; films pressed from this material have similar flameproof properties.

Example 4

10 lbs. of cellulose acetate butyrate, 3 lbs. of chlorinated paraffin having 70% of chemically combined chlorine, 2 lbs. of antimony oxide, and 0.5 lb. of tricresyl phosphate are mixed in the manner of Examples 1 and 2 and placed in the cylinder of a small injection molding machine, the temperature of the cylinder being between 350–400° F. Poker chips are injection molded under a pressure of 4,000–5,000 lbs. per square inch from this material, which has remained in the heated cylinder of the apparatus for less than five minutes. The poker chips which have a thickness of about $\frac{1}{16}$ of an inch are similarly self-extinguishable within a period of one second when a flame of a Bunsen burner, having a blue cone of about 2 inches in length, is applied thereto for a period of five seconds and then removed.

Example 5

20 gms. of clear polystyrene, 4 gms. of chlorinated paraffin having 70% of chemically combined chlorine, and 2 gms. of antimony oxide are combined in the manner of Examples 1 and 2 and films are pressed therefrom in the manner of Examples 1 and 2. These films are self-extinguishable in the manner described in connection with Examples 1 and 2.

Example 6

20 gms. of clear polystyrene, 4 gms. of chlorinated paraffin having 66% of chemically combined chlorine, 2 gms. of arsenic trioxide, and 1 gm. of tricresyl phosphate are intimately combined in the manner of Examples 1 and 2. Films pressed from such a composition have similar self-extinguishing properties to those described in Example 5.

Example 7

20 gms. of clear polystyrene, 4 gms. of chlorinated paraffin having 70% of chemically combined chlorine, 2 gms. of antimony oxide, and 1 gm. of chlorinated paraffin having 40% of chemically combined chlorine are combined in the manner of Example 6. A film produced from this composition in the manner of Examples 1 and 2 has similar flame-resistant properties and is considerably less brittle than the films obtained from non-plasticized compositions.

As noted hereinbefore, it is often desirable, particularly to facilitate the injection or other molding of the thermoplastic materials, to incorporate in the combination a lubricating material which improves the action of the material in injection molding and in particular, enables the molded shape to be removed from the die with greater facility. The examples which follow illustrate uses incorporating a lubricating material:

Example 8

300 gms. of polyethylene are milled on a rubber mill at a roll temperature of approximately 350° F., the front roll having a speed of 40 feet per minute and the rear roll having a speed of 56 feet per minute, for 20 minutes until the polyethylene is thoroughly softened and thoroughly in a workable condition. Thereupon, 46 gms. of chlorinated paraffin having 70% of chemically combined chlorine, 46 gms. of antimony oxide, 5 gms. of calcium stearate, and 3 gms. of tricresyl phosphate are added in increments to the polyethylene on the roll and the material further milled until thorough mixing is achieved for about 25 minutes. Upon removal from the mill and cooling, a sample is tested for flameproofness by holding the same in a Bunsen burner flame, having a blue cone of approximately 2 inches in length, for a period of 6 seconds and then removing the same and observing the length of time elapsing until the flame self-extinguishes. This sample self-extinguished in a period of less than 1 second. The treated polyethylene is white in color, entirely opaque, and is suitable for injection molding and other molding operations at temperatures of the order of 350° F.

Example 9

65 gms. of cellulose propionate, 15 gms. of chlorinated paraffin having 70% of chemically combined chlorine, 15 gms. of antimony oxide, and 5 gms. of tricresyl phosphate are combined in the manner of Example 8, that is, the cellulose propionate is first milled on the rubber mill under the same temperature and speed conditions, and then the mixture of chlorinated paraffin, antimony oxide, and tricresyl phosphate added in small increments and the whole milled for about 25 minutes until mixing is complete. This mixture, when removed from the mill and cooled, is tested in a Bunsen burner in the manner described in Example 8 above, and is found to be self-extinguishing in a period of about 2 seconds when removed from the flame.

Example 10

49.5 gms. of natural smoked sheet rubber are applied to a rubber mill, the front roll of which is moving at a rate of 38 feet per minute and the back roll of which is moving at a rate of about 57 feet per minute, the rolls being maintained at a temperature of about 104° F., until the material is well worked in on the mill and in plastic form. To this milled rubber is added a mixture of flameproofing ingredients including 6.3 gms. of chlorinated paraffin having about 70% of chemically combined chlorine, 9.5 gms. of antimony oxide, and 0.6 gm. of calcium stearate. After milling for about 5 minutes, a sample is removed from the mill in completely homogeneous form. The material is tested in a Bunsen burner flame and is found to be self-extinguishing in a period of about 4 seconds.

Example 11

70 gms. of styrene butadiene copolymer synthetic rubber (known as GR–S) are milled on a rubber mill in the manner of Example 10. Thereupon, a mixture of 15 gms. of chlorinated paraffin having 70% of chemically combined chlorine and 15 gms. of antimony oxide is added in small increments. Milling is continued for about 20 minutes until the mixture is complete and then the sample is removed from the mill. When tested in a Bunsen burner flame, the material is found totally to fail to support combustion and is self-extinguishing in a period of less than one second.

Example 12

70 gms. of a polyterpene resin comprising essentially a mixture of polymers of unsaturated terpadiene having a melting point by the ball and ring method of 125° C. are combined at a temperature of 140° C. with 15 gms. of chlorinated paraffin having 70% of chemically combined chlorine and 15 gms. of antimony oxide. When the mixture is completely homogeneous, it is permitted to cool and harden. A small sample taken from the mixture at room temperature is self-extinguishing in a period of less than 2 seconds after exposure to a Bunsen burner flame.

Example 13

70 gms. of coumarone-indene resin of melting point 110–126.9° C., being a flake form material of light yellow color, is heated to above its melting point and combined with 15 gms. of chlorinated paraffin having 70% of chemically combined chlorine and 15 gms. of antimony oxide. The material, after mixing to a state of homogeneity, is cooled and solidified and a sample thereof is found to be self-extinguishing in a period of less than one second when tested in a Bunsen burner flame.

While here have been described various embodiments of the invention, the products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner. it being intended to cover the invention broadly in whatever form its principle may be utilized.

What is claimed is:

1. A composition of matter consisting of a moldable thermoplastic composition of substantial flameproofing properties, said composition being an intimate mixture of a major proportion of at least 50% of an inflammable polymeric thermoplastic material and a minor proportion of at least 15% of flameproofing constituents comprising a highly chlorinated high molecular weight organic material, containing more than eight carbon atoms, selected from the group consisting of chlorinated aliphatic hydrocarbons and mixtures of chlorinated aliphatic hydrocarbons and chlorinated cycloaliphatic hydrocarbons and containing between 50 and 80% of chemically combined chlorine and an inorganic flame-retardant substance selected from the group consisting of oxides and sulfides of Group Vb elements of the Periodic System having atomic numbers of 33 or more, said thermoplastic material and said flameproofing constituents together being substantially 100% of the composition.

2. A composition as claimed in claim 1, wherein the polymeric thermoplastic material is of natural origin.

3. A composition as claimed in claim 1, wherein the polymeric thermoplastic material is of synthetic origin.

4. A composition as claimed in claim 1, wherein the polymeric thermoplastic material comprises polystyrene.

5. A composition as claimed in claim 1, wherein the polymerized thermoplastic material comprises cellulose acetate butyrate.

6. A composition as claimed in claim 1, wherein the flameproofing ingredients comprise between 15% and 30% of the total composition.

7. A composition as claimed in claim 1, wherein the inorganic flame-retardant substance comprises antimony oxide.

8. A composition as claimed in claim 1, wherein the inorganic flame-retardant substance comprises arsenic trioxide.

9. A composition as claimed in claim 1, wherein the highly chlorinated high molecular weight organic material comprises chlorinated paraffin wax having from 50% to 80% of chemically combined chlorine.

10. A composition as claimed in claim 1, wherein the highly chlorinated high molecular weight organic material comprises chlorinated paraffin wax having 70% of chemically combined chlorine.

11. A composition as claimed in claim 1, wherein the polymeric thermoplastic material comprises polyethylene.

12. A composition of matter consisting of a moldable thermoplastic composition of substantial flameproofing properties, said composition being an intimate mixture of a major proportion of at least 50% of an inflammable polymeric thermoplastic material and a minor proportion of at least 15% of flameproofing constituents comprising chlorinated paraffin wax having from 50% to 80% of chemically combined chlorine and antimony oxide, said thermoplastic material and said flameproofing constituents together being substantially 100% of the composition.

13. A composition of matter consisting of a moldable thermoplastic composition of substantial flameproofing properties, said composition being an intimate mixture of a major proportion of at least 50% of an inflammable polymeric thermoplastic material and a minor proportion of at least 15% of flameproofing constituents comprising chlorinated paraffin wax having 70% of chemically combined chlorine and antimony oxide, said thermoplastic material and said flameproofing constituents together being substantially 100% of the composition.

14. A composition as claimed in claim 1 wherein the polymeric thermoplastic material is a cellulose ester.

15. A composition as claimed in claim 1 wherein the polymeric thermoplastic material is a cellulose ether.

16. A composition as claimed in claim 1 wherein the polymeric thermoplastic material is a poly vinyl compound.

17. A composition as claimed in claim 1 wherein the polymeric thermoplastic material is natural rubber.

LESTER A. BIERLY.

References Cited in the file of this patent

UNITED STATES PATENTS

| Number | Name | Date |
|---|---|---|
| 2,044,176 | McCulloch | June 16, 1936 |
| 2,378,714 | Leatherman | June 19, 1945 |
| 2,378,715 | Leatherman | June 19, 1945 |
| 2,416,447 | Laughlin | Feb. 25, 1947 |
| 2,428,282 | Kemmler | Sept. 20, 1947 |
| 2,436,216 | Leatherman | Feb. 17, 1948 |
| 2,480,298 | Happoldt | Aug. 30, 1949 |
| 2,588,362 | Danison | Mar. 11, 1952 |
| 2,590,211 | Rugar | Mar. 25, 1952 |